(12) United States Patent
Sasaki et al.

(10) Patent No.: US 7,633,847 B2
(45) Date of Patent: Dec. 15, 2009

(54) RECORDING APPARATUS AND RECORDING METHOD

(75) Inventors: Takashi Sasaki, Kanagawa (JP);
Munetoshi Moriichi, Saitama (JP);
Mitsuyuki Bamba, Saitama (JP);
Yoshiyasu Masuda, Tokyo (JP)

(73) Assignee: Sony Corporation, Tokyo (JP)

(*) Notice: Subject to any disclaimer, the term of this patent is extended or adjusted under 35 U.S.C. 154(b) by 772 days.

(21) Appl. No.: 11/039,007

(22) Filed: Jan. 19, 2005

(65) Prior Publication Data

US 2005/0122873 A1  Jun. 9, 2005

Related U.S. Application Data

(62) Division of application No. 10/615,917, filed on Jul. 10, 2003, now Pat. No. 6,856,588, which is a division of application No. 09/650,929, filed on Aug. 29, 2000, now Pat. No. 6,614,739.

(30) Foreign Application Priority Data

Aug. 31, 1999  (JP) ............... P11-244930

(51) Int. Cl.
*G11B 7/00* (2006.01)
(52) U.S. Cl. .............................. 369/59.12
(58) Field of Classification Search ......... 369/59.1, 369/59.11, 59.12, 47.1, 47.27, 59.24, 275.3, 369/47.24
See application file for complete search history.

(56) References Cited

U.S. PATENT DOCUMENTS

| 4,646,103 | A | 2/1987 | Sugiyama et al. |
| 5,636,194 | A | 6/1997 | Furumiya et al. |
| 5,732,062 | A | 3/1998 | Yokoi et al. |
| 5,745,467 | A | 4/1998 | Sakaue et al. |
| 6,188,658 | B1 | 2/2001 | Saga et al. |
| 6,236,635 | B1 * | 5/2001 | Miyamoto et al. .......... 369/116 |
| 6,430,132 | B1 | 8/2002 | Saga et al. |

FOREIGN PATENT DOCUMENTS

| JP | 05-234079 | 9/1993 |
| JP | 06-314429 | 11/1994 |
| JP | 07-225947 | 8/1995 |

OTHER PUBLICATIONS

U.S. Appl. No. 11/037,086, filed Jan. 19, 2005, Sasaki et al.

* cited by examiner

*Primary Examiner*—Nabil Z Hindi
(74) *Attorney, Agent, or Firm*—Oblon, Spivak, McClelland, Maier & Neustadt, L.L.P.

(57) ABSTRACT

A recording apparatus generates a first pulse (EQEFM signal) in accordance with recording data such as an EFM signal. A second pulse (first overdrive pulse) to be combined with substantially the leading edge of the first pulse is generated. A third pulse (end overdrive pulse) to be combined with substantially the trailing edge of the first pulse is generated. The first, second, and third pulses are combined to synthesize a driving pulse, and the driving pulse is supplied to a laser unit. At least one of the first, second, and third pulses is controlled so that one of the level and the pulse duration thereof is varied in accordance with the length of formed pits and lands.

15 Claims, 11 Drawing Sheets

RECORDING APPARATUS AND RECORDING METHOD

CROSS-REFERENCE TO RELATED APPLICATIONS

The present application is a divisional of application Ser. No. 10/615,917, filed Jul. 10, 2003, which is a divisional of application Ser. No. 09/650,929, filed Aug. 29, 2000 (now U.S. Pat. No. 6,614,739), which claims priority to Japanese Patent Application No. P11-244930, filed Aug. 31, 1999.

BACKGROUND OF THE INVENTION

1. Field of the Invention

The present invention relates to a recording apparatus and a recording method for performing light modulation recording, that is, data recording on a recording medium by a laser beam modulated by recording data.

2. Description of the Related Art

When performing light modulation recording on a recording medium such as an optical disk or the like, a laser emits light in pulses in order to perform thermal control for shaping a pit (mark) to be formed on the disk.

Specifically, a pulse waveform as a driving pulse for driving the laser is arranged, and the level (peak value) during each pulse period is controlled, thereby controlling the laser power and the laser irradiation time.

Figure 14:
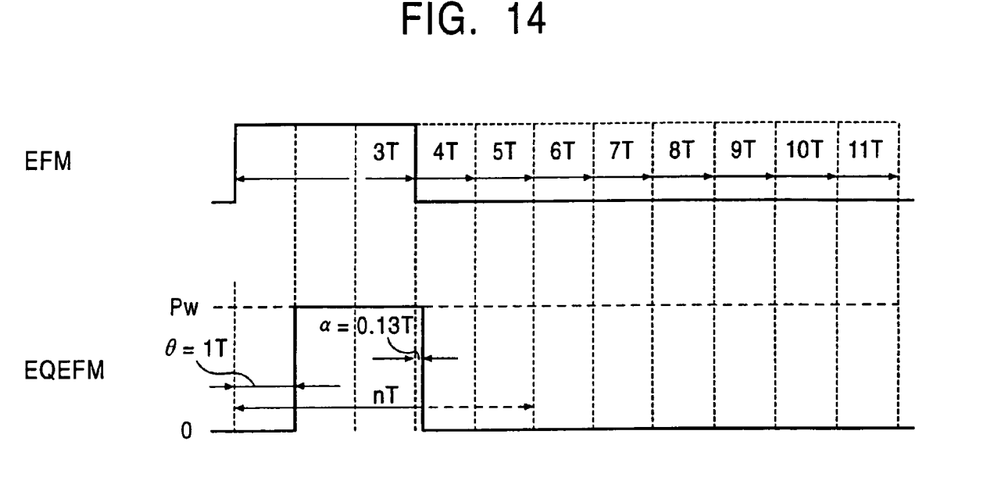
FIG. 14 illustrates a conventional laser driving pulse generating method.
Figure 15:
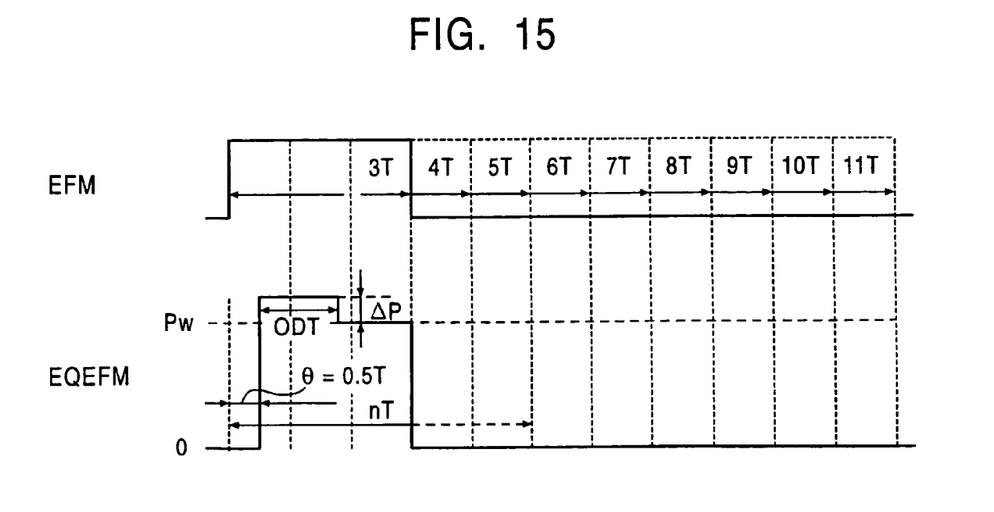
FIG. 15 illustrates another conventional laser driving pulse generating method.

For example, data is written on disk media in which data can be written, namely, CD-recordable (CD-R) which is CD-write once (CD-WO) and CD-rewritable (CD-RW), at data writing speeds of ×1, ×2, and ×4 speeds. Laser emission control in accordance with the writing speed is performed as shown in FIGS. 14 and 15. The ×1 speed corresponds to 1.2 to 1.4 m/s, which is achieved by rotating a disk in a constant linear velocity (CLV) mode.

FIG. 14 shows a driving pulse generated when writing at a ×1 writing speed or a ×2 writing speed.

It is known that a CD system generates an EFM signal as recording data. The pulse duration of the EFM signal is specified within a range of 3 T to 11 T, as shown in FIG. 14. The letter "T" corresponds to one channel clock period.

Based on the EFM signal, an equalized EFM signal (hereinafter referred to as an "EQEFM signal") is generated, as shown in FIG. 14. The EQEFM signal is used as a laser driving pulse.

In the example shown in FIG. 14, the EQEFM signal has a pulse which basically has a duration of (N−1)T compared with (N)T of the EFM pulse (in the drawing, θ=1 T).

For example, concerning the EFM signal having a pulse duration of 4 T, the EQEFM signal having a pulse duration of 3 T is generated. Concerning the EFM signal having a pulse duration of 11 T, the EQEFM signal having a pulse duration of 10 T is generated. With regard to the EFM signal having a pulse duration of 3 T, a period of α=0.13 T is added to the pulse duration of the EQEFM signal. The symbol "Pw" represents the writing laser power.

The EQEFM signal corresponds to the laser emission level. Concerning the EFM pulse having a duration of (N)T, the EQEFM signal having a pulse duration of (N−1)T is generated. This is configured so in anticipation of a portion in which a pit is formed by thermal accumulation immediately after the laser emission is stopped.

Figure 16:
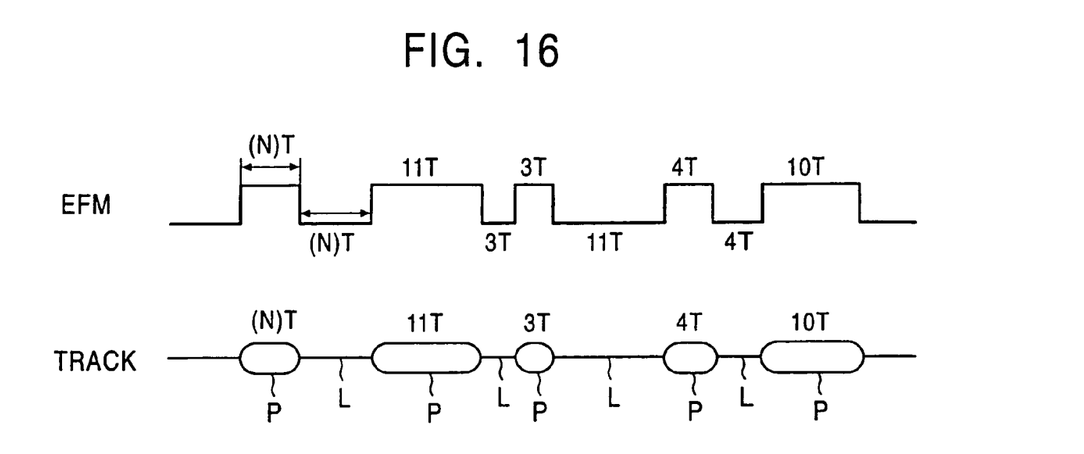
FIG. 16 illustrates the relationship between an EFM signal and pits and lands.

Therefore, the relationship between the EFM signal and the formed pits P and lands L is such that the pulse duration is associated with the pit length and the land length, as shown in FIG. 16.

FIG. 15 shows a driving pulse generated when writing at a ×4 writing speed.

In the example shown in FIG. 15, the EQEFM signal has a pulse which basically has a duration of (N−0.5)T with respect to the EFM pulse having a duration of (N)T (in the drawing, θ=0.5 T). For example, concerning the EFM signal with a pulse duration of 4 T, the EQEFM signal having a pulse duration of 3.5 T is generated.

In this case, an increased power portion expressed by ΔP is added to period ODT at the leading edge of the pulse. Hereinafter, the increased power portion or a pulse for forming the increased power portion is referred to as an overdrive pulse.

Figure 17:
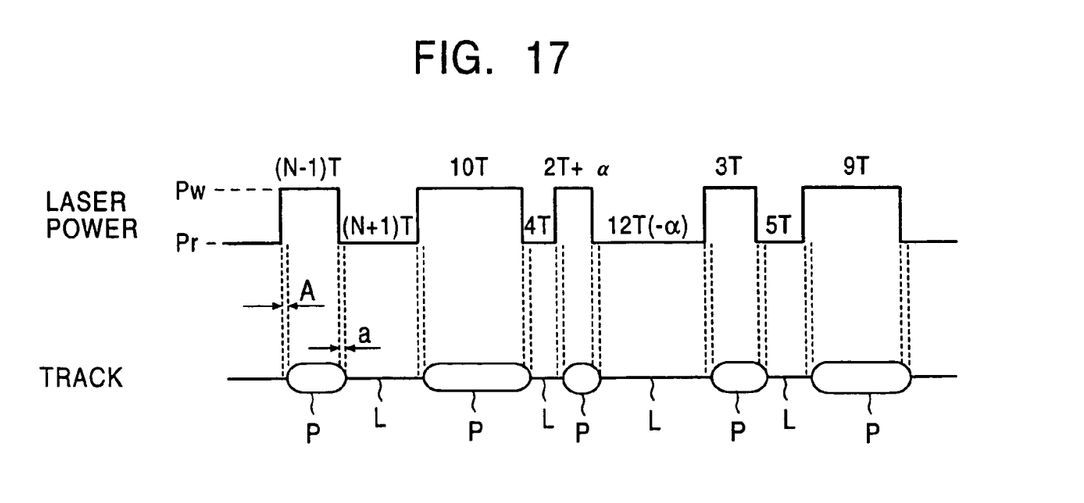
FIG. 17 illustrates the laser power and pits and lands obtained by using the conventional laser driving pulse generating method shown in FIG. 14.
Figure 18:
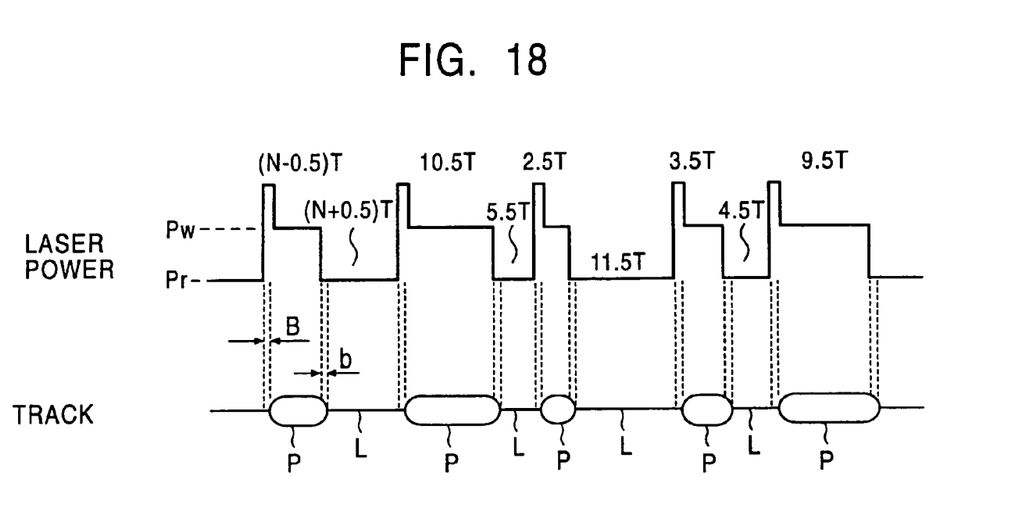
FIG. 18 illustrates the laser power and pits and lands obtained by using the conventional laser driving pulse generating method shown in FIG. 15.

FIG. 17 shows pits and lands formed by a laser which is driven to emit light based on a driving pulse generated by the method shown in FIG. 14. FIG. 18 shows pits and lands formed by a laser which is driven to emit light based on a driving pulse generated by the method shown in FIG. 15.

FIGS. 17 and 18 show the laser power controlled by driving pulses generated based on the EFM signal shown in FIG. 16. The symbol "Pw" represents the writing laser power, and the symbol "Pr" represents the reading laser power. FIGS. 17 and 18 show the formed pits P and lands L.

Referring to FIGS. 17 and 18, period A and period B each indicate a delay from the start of the laser beam emission until the formation of the pit P starts. Period a and period b each indicate a delay from the termination of the laser emission until the formation of the pit P is completed.

Recently, recording rates have been increased. Concerning CD-R and CD-RW, the recording rates have been further increased. For example, recording at a ×8 speed has been achieved.

Upon recording at the ×8 speed, when the laser power is controlled by the method shown in FIG. 14 or by the method shown in FIG. 15, inter symbol interference occurs, and jitter of the recording data increases. In the worst case, the recording data cannot be read.

SUMMARY OF THE INVENTION

Accordingly, it is an object of the present invention to implement laser power control so that appropriate recording is performed at a fast recording rate.

According to one aspect of the present invention, there is provided a recording apparatus. The recording apparatus includes a laser unit for performing laser beam irradiation with a supplied driving pulse to form a recording data row on a recording medium. The data row is formed of pits and lands, in which the lands are between the pits and the pits are before and after the lands. A driving pulse generator generates a first pulse in accordance with recording data, a second pulse to be combined with the leading edge of the first pulse, and a third pulse to be combined with the trailing edge of the first pulse. The driving pulse generator synthesizes the driving pulse by combining the first, second, and third pulses. A pulse generation controller controls at least one of the first, second, and third pulses generated by the driving pulse generator so that one of the level and the pulse duration thereof is varied in accordance with the length of at least one of the formed pits and lands.

Preferably, the pulse generation controller variably sets, in accordance with a predetermined recording condition, the level of each of the second and third pulses.

The pulse generation controller may variably set, in accordance with a predetermined recording condition, the pulse duration of each of the second and third pulses within a range of 0 T to 3 T.

The pulse generation controller may variably set, in accordance with the length of at least one of the pit and the land immediately formed before, the pulse duration of at least one of the first, second, and third pulses.

The recording apparatus may further include a detector for detecting the length of the land immediately formed before the formed pit. The pulse generation controller may vary the pulse duration of the first pulse in accordance with the detected land length.

The detector may detect the length of the formed pit. The pulse generation controller may vary the pulse duration of the first pulse in accordance with the detected pit length.

The detector may detect the length of the land formed immediately after the formed pit. The pulse generation controller may vary the pulse duration of the first pulse in accordance with the detected land length.

The recording apparatus may further include a switch for switching the operation of the driving pulse generator so that at least one of the first, second, and third pulses generated by the driving pulse generator is not output. The pulse generation controller may control the switch in accordance with a speed at which the recording data row is formed on the recording medium.

The recording medium may be a write once optical disk. The pulse generation controller may control the switch so that the third pulse is not output when the optical disk is rotated at a linear velocity not greater than a four-times speed of a reference linear velocity.

According to another aspect of the present invention, there is provided a recording method. The recording method includes a generating step of generating a first pulse in accordance with recording data, a second pulse to be combined with the leading edge of the first pulse, and a third pulse to be combined with the trailing edge of the first pulse, in which one of the level and the pulse duration is varied in accordance with the length of at least one of formed pits and lands. In a synthesizing step, a driving pulse is synthesized by combining the first, second, and third pulses. In a forming step, a recording data row is formed on a recording medium by performing laser beam irradiation using the driving pulse. The recording data row is formed of the pits and the lands, in which the lands are between the pits and the pits are before and after the lands.

The recording method may further include a control step of controlling, in the generating step of generating the first, second, and third pulses, the second and third pulses not to be generated in accordance with a speed at which the recording data row is formed on the recording medium.

Accordingly, thermal interference between codes (pits and lands) to be recorded is reduced. When recording at a fast recording rate, such as a ×8 speed, appropriate pits and lands are formed in which a sufficient read margin is obtained. A reduction in recording jitter improves the quality of recording data. Recording in accordance with a recording environment is performed.

DESCRIPTION OF THE PREFERRED EMBODIMENT

The present invention will be understood from the following description of a disk drive according to an embodiment which conforms to CD-R and CD-RW.

CD-R is a write-once medium in which organic dye is used to form a recording layer. CD-RW is a medium in which data can be rewritten by using a phase change technique.

Figure 1:
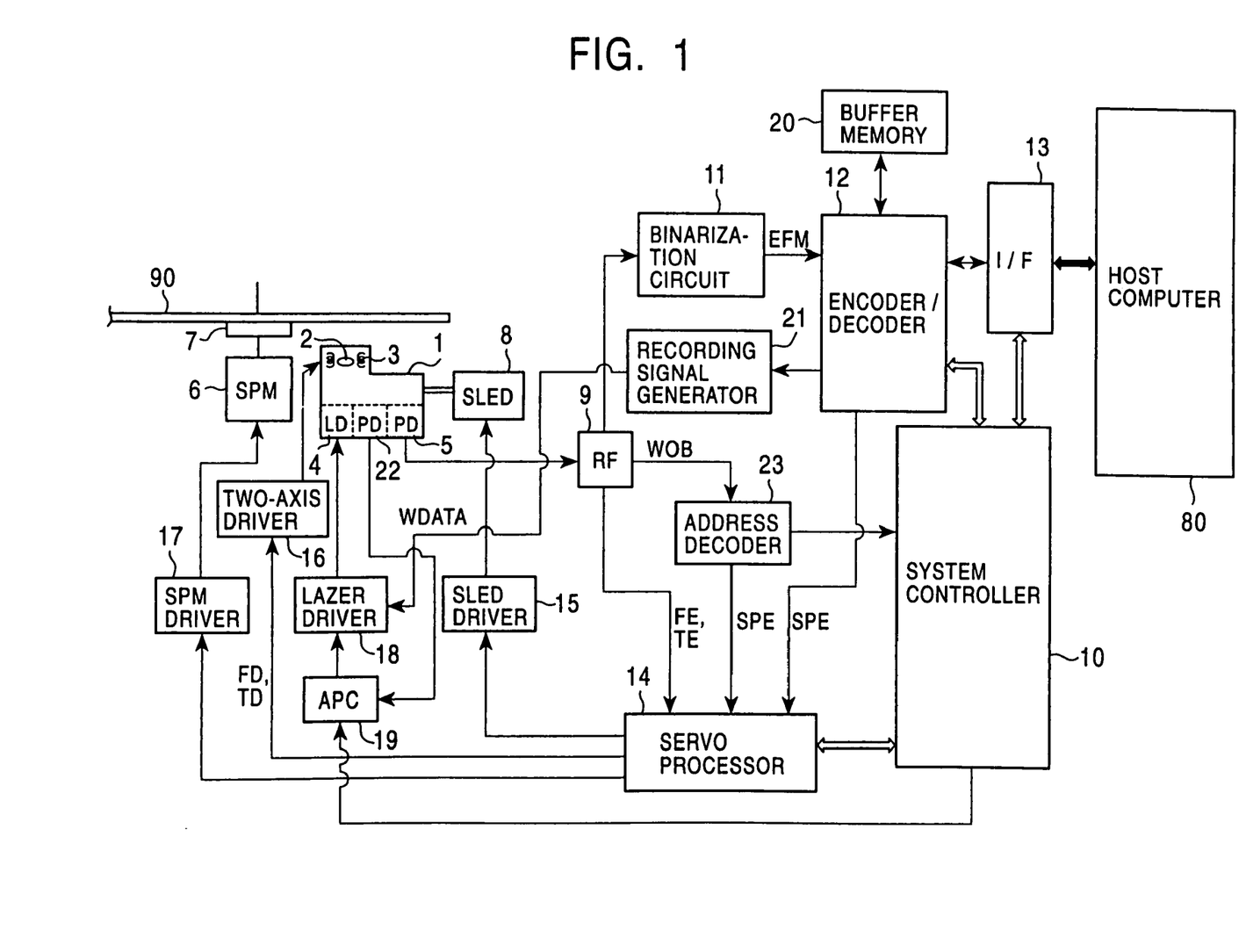
FIG. 1 is a block diagram of a recording and reading apparatus according to an embodiment of the present invention.

Referring to FIG. 1, the structure of the disk drive according to the embodiment for reading and writing data to a disk such as a CD-R or a CD-RW disk is described.

In FIG. 1, a disk 90 is a CD-R or a CD-RW disk. Also, a CD-DA or a CD-ROM as the disk 90 can be read.

The disk 90 is mounted on a turntable 7. When reading or writing, the turntable 7 is rotated and driven by a spindle motor 1 at a constant linear velocity (CLV) or a constant angular velocity (CAV). An optical pick-up 1 reads pit data (phase change pits or pits formed by organic dye change (reflectivity change)) on the disk 90. In the case of the CD-DA or the CD-ROM, the pits are embossed pits.

In the pick-up 1, a laser diode 4 used as a laser light source, a photo detector 5 for detecting reflected light, an objective lens 2 used at an output end of the laser beam, and an optical system (not shown) for irradiating a disk recording surface with the laser beam through the objective lens 2 and for guiding the reflected light to the photo detector 5 are formed.

Also, a monitor detector 22 for receiving part of the light output from the laser diode 4 is provided.

The objective lens 2 is movably retained in the tracking direction and in the focusing direction by a two-axis mechanism 3.

The entire pick-up 1 is movable in the radial direction of the disk by a sled mechanism 8.

The laser diode 4 in the pick-up 1 is driven to emit light by a driving signal (driving current) from a laser driver 18.

Light information reflected from the disk 90 is detected by the photo detector 5. In accordance with the quantity of received light, the detected light information is supplied as an electrical signal to a radio frequency (RF) amplifier 9.

The RF amplifier 9 includes a current-voltage converting circuit in accordance with the output current from a plurality of light receiving elements as the photo detector 5, a matrix arithmetic/amplifier circuit, and the like. A necessary signal is generated by matrix arithmetic processing. For example, an RF signal used as read data, and a focus error signal FE and a tracking error signal TE used to perform servo control are generated.

The read RF signal output from the RF amplifier 9 is supplied to a binarization circuit 11, and the focus error signal FE and the tracking error signal TE are supplied to a servo processor 14.

A groove to be used as a guide on a recording track is formed in advance on the CD-R or CD-RW disk 90. The groove wobbles (meanders) due to a signal in which time information indicating an absolute address on the disk is FM-modulated. When writing, it is possible to perform tracking servo based on the groove information, and to obtain the absolute address based on wobbling information WOB of the groove. The RF amplifier 9 extracts the wobbling information WOB by the matrix arithmetic processing, and supplies the wobbling information WOB to an address decoder 23.

The address decoder 23 demodulates the supplied wobbling information WOB, thus obtaining the absolute address. The absolute address is supplied to a system controller 10.

By supplying the groove information to a phase-locked loop (PLL) circuit, information on the rotation speed of the spindle motor 6 is obtained. Comparison between the obtained rotation speed information and reference speed information generates a spindle error signal SPE, and the spindle error signal SPE is output.

The read RF signal obtained by the RF amplifier 9 is binarized by the binarization circuit 11, thereby forming a so-called eight to fourteen modulation (EFM) signal. The EFM signal is supplied to an encoder/decoder 12.

The encoder/decoder 12 includes a function region used as the decoder when reading and a function region used as the encoder when writing.

When reading, the encoder/decoder 12 performs EFM modulation, cross interleaved Reed-Solomon code (CIRC) error correction, de-interleaving, and CD-ROM decoding as decoding processing. Hence, read data which is converted into CD-ROM format data is obtained.

Also, the encoder/decoder 12 extracts a sub-code from data read from the disk 90, and supplies a table of contents (TOC) and address information as the sub-code (Q data) to the system controller 10.

Furthermore, the encoder/decoder 12 generates a read clock in synchronism with the EFM signal by PLL processing. Based op the read clock, the encoder/decoder 12 performs the above decoding processing. The rotation speed information of the spindle motor 6 is obtained based on the read clock, and the rotation speed information is compared with the reference speed information. Hence, the spindle error signal SPE is generated and output.

When reading, the encoder/decoder 12 stores the data decoded as above in a buffer memory 20.

The data buffered in the buffer memory 20 is read, transferred, and output as a read output from the drive.

An interface 13 is connected to an external host computer 80, and communicates recording data, read data, and various commands with the host computer 80. In fact, an interface conforming to the small computer system interface (SCSI) or the advanced technology attachment packet interface (ATAPI) is adopted. When reading, the decoded read data stored in the buffer memory 20 is transferred and output to the host computer 80 through the interface 13.

Read commands, write commands, and other signals from the host computer 80 are supplied to the system controller 10 through the interface 13.

In contrast, when writing, recording data such as audio data and CD-ROM data is transferred from the host computer 80. The recording data is transmitted from the interface 13 to the buffer memory 20, and the recording data is buffered in the buffer memory 20.

In this case, the encoder/decoder 12 performs, as encoding processing of the buffered recording data, encoding of CD-ROM format data as CD format data when the supplied data is the CD-ROM format data, CIRC encoding, interleaving, sub-code addition, and EFM modulation.

The EFM signal obtained by the encoding processing performed by the encoder/decoder 12 undergoes processing referred to as write equalization which is performed by a recording signal generator 21. Subsequently, the processed EFM signal is transmitted as write data WDATA to the laser driver 18. The recording signal generator 21 generates and outputs an EQEFM signal, a first overdrive pulse, and an end overdrive pulse as the write data WDATA. This is described in the following description with reference to FIG. 2.

The laser driver 18 converts the EQEFM signal, the first overdrive pulse, and the end overdrive pulse, which are supplied as the write data WDATA, into current signals. The current signals are combined and sent to the laser diode 4, thereby driving the laser diode 4 to emit light. Accordingly, pits (phase change pits or dye change pits) in accordance with the EFM signal are formed on the disk 90.

An auto power control (APC) circuit 19 monitors the laser output power based on the output power of the monitor detector 22 and controls the output power of the laser to remain constant independent of temperature and the like. A desired value of the laser output power is supplied from the system controller 10. The laser driver 18 is controlled so that the level of the laser output power becomes the desired value.

Based on the focus error signal FE and the tracking error signal TE from the RF amplifier 9, the spindle error signal SPE from the encoder/decoder 12 or the address decoder 20, and the like, the servo processor 14 generates various servo driving signals including focus, tracking, sled, and spindle driving signals, thereby performing servo operations.

Specifically, a focus driving signal FD and a tracking driving signal TD are generated in accordance with the focus error signal FE and the tracking error signal TE, respectively. The focus driving signal FD and the tracking driving signal TD are supplied to a two-axis driver 16. The two-axis driver 16 drives a focus coil and a tracking coil in the two-axis mechanism 3 in the pick-up 1. Hence, a tracking servo loop and a focus servo loop are formed by the pick-up 1, the RF amplifier 9, the servo processor 14, the two-axis driver 16, and the two-axis mechanism 3.

In response to a track jump command from the system controller 10, the tracking servo loop stops. A jump driving signal is output to the two-axis driver 16, thus causing the two-axis driver 16 to perform a track jump operation.

The servo processor 14 supplies a spindle driving signal generated in response to the spindle error signal SPE to a spindle motor driver 17. In response to the spindle driving signal, the spindle motor driver 17 supplies, for example, a three-phase driving signal to the spindle motor 6, thus causing the spindle motor 6 to rotate at the CLV or the CAV. In response to a spindle kick/brake control signal from the system controller 10, the servo processor 14 generates the spindle driving signal, thus causing the spindle motor driver 17 to activate, stop, accelerate, or decelerate the spindle motor 6.

Based on, for example, a sled error signal obtained as a low-frequency component of the tracking error signal TE and on access execution control by the system controller 10, the servo processor 14 generates a sled driving signal, and the sled driving signal is supplied to a sled driver 15. The sled driver 15 drives the sled mechanism 8 in response to the sled driving signal. The sled mechanism 8 has a mechanism (not shown) including a main shaft for retaining the pick-up 1, a sled motor, a transmission gear, and the like. The sled driver 15 drives the sled motor 8 in response to the sled driving signal, thus causing the pick-up 1 to perform necessary sliding.

Various operation of the servo system and the read/write system is controlled by the system controller 10 formed by a micro computer.

The system controller 10 performs various processing in response to commands from the host computer 80.

For example, when a read command requesting the transfer of certain data recorded on the disk 90 is supplied from the host computer 80, seek operation control aiming at the designated address is performed. Specifically, a command is issued to the servo processor 14, and the pick-up 1 gains access to the address designated by a seek command.

Subsequently, operation control required to transfer the data in the designated data segment to the host computer 80 is performed. Specifically, the data is read from the disk 90, and the read data is decoded and buffered, thereby transferring the data.

When a write command is issued from the host computer 80, the system controller 10 moves the pick-up 1 to an address at which writing is to be performed. The encoder/decoder 12 encodes the data transferred from the host computer 80, as described above, and the EFM signal is thus generated.

When the write data WDATA is supplied from the recording signal generator 21 to the laser driver 18, as described above, recording is performed.

Figure 2:
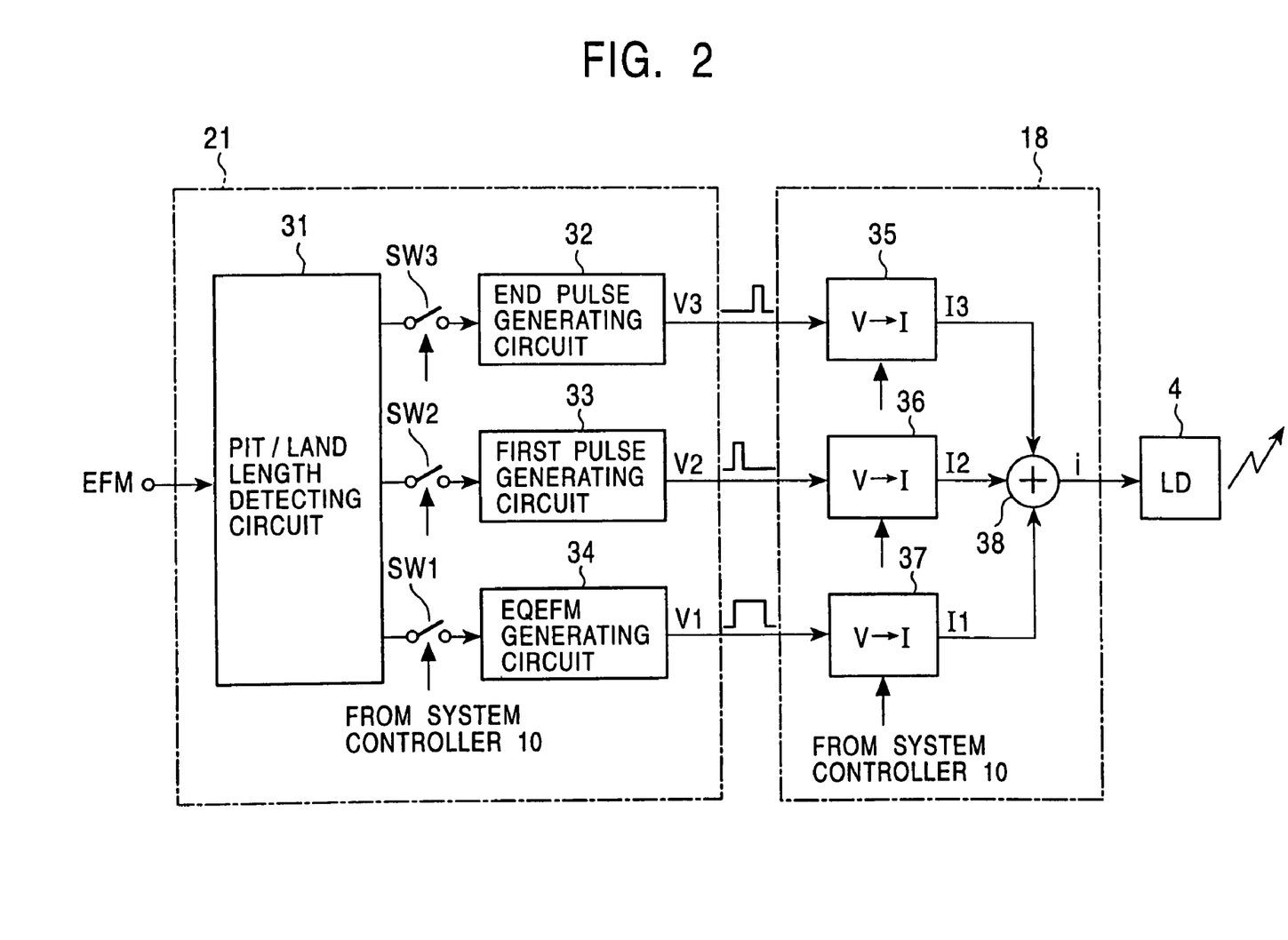
FIG. 2 is a block diagram of a writing laser power control system of the embodiment.

FIG. 2 shows a section of the disk drive for generating a laser driving pulse which is generated when writing.

When writing, the EFM signal is supplied from the encoder/decoder 12 to the recording signal generator 21. The recording signal generator 21 includes a pit/land length detecting circuit 31, an end pulse generating circuit 32, a first pulse generating circuit 33, and an EQEFM generating circuit 34.

Based on the EFM signal, the EQEFM generating circuit 34 generates an EQEFM signal V1 which is at a predetermined level and which has a predetermined pulse width.

The first pulse generating circuit 33 generates a first overdrive pulse V2 which is to be added to substantially the leading edge of the laser driving pulse.

The end pulse generating circuit 32 generates an end overdrive pulse V3 which is to be added to substantially the trailing edge of the laser driving pulse.

The end pulse generating circuit 32, the first pulse generating circuit 33, and the EQEFM generating circuit 34 generate the signals V1, V2, and V3, respectively, each having a pulse width in accordance with the pulse duration of the EFM signal. Based on the pulse duration of the current EFM signal and the pit length and the land length immediately before each pulse which are detected by the pit/land length detecting circuit 31, the pulse width and the pulse level (voltage level) are variably controlled.

Switches SW1, SW2, and SW3 are switching circuits for enabling/disenabling the EQEFM signal V1, the first overdrive pulse V2, and the end overdrive pulse V3, respectively. The switches SW1, SW2, and SW3 are controlled by the system controller 10. In response to a write command or a mode setting command from the host computer 80, the system controller 10 determines at which speed the recording data transferred from the host computer 80 is to be recorded. The system controller 10 changes over the switches SW1, SW2, and SW3 in accordance with the requested writing speed. For example, when writing at a ×1 writing speed or a ×2 writing speed, as in the driving pulses shown in FIGS. 14 and 17, the switches SW2 and SW3 are turned off so that the first overdrive pulse V2 and the end overdrive pulse V3 are not added to the EQEFM signal V1. Hence, the first pulse generating circuit 33 and the end pulse generating circuit 32 are disenabled. When the requested writing speed is a ×4 speed, only the switch SW3 is turned off so that, as in the driving pulses shown in FIGS. 15 and 18, the end overdrive pulse V3 is not output. When recording data at an ×8 speed which is newly achieved in the present invention, the switches SW1, SW2, and SW3 are turned on, thereby outputting the driving pulse shown in FIGS. 4 to 9.

Specific examples of pulses as the signals V1, V2, and V3 are described in the following description.

The EQEFM signal V1, the first overdrive pulse V2, and the end overdrive pulse V3 are converted into current signals i1, i2, and i3, respectively, by the laser driver 18, i.e., by voltage/current converting circuits 37, 36, and 35, respectively.

An adding circuit 38 adds the current signals i1, i2, and i3 to generate a driving current i, which is to be supplied to the laser diode 4.

In this embodiment, a control signal is input from the system controller 10 to the voltage/current converting circuits 37, 36, and 35. Depending on the disk rotation speed (linear velocity with respect to a track) when writing, the length of a pit to be recorded, the material of the recording layer (dye film) used in the disk 90, the ambient temperature, and the like, the level (amplitude) of each pulse is changed. In this case, the control signal and a parameter are input from the system controller 10. Therefore, the levels (amplitude) of the signals V1, V2, and V3 are individually controlled by the parameters input to the voltage/current converting circuits 37, 36, and 35. In this embodiment, the voltage/current converting circuits 37, 36, and 35 each have a level adjusting function. Alternatively, a separate level adjusting circuit can be provided at a preceding stage or a subsequent stage of each of the voltage/current converting circuits 37, 36, and 35.

The laser power controlled by the above structure is described below.

Figure 3:
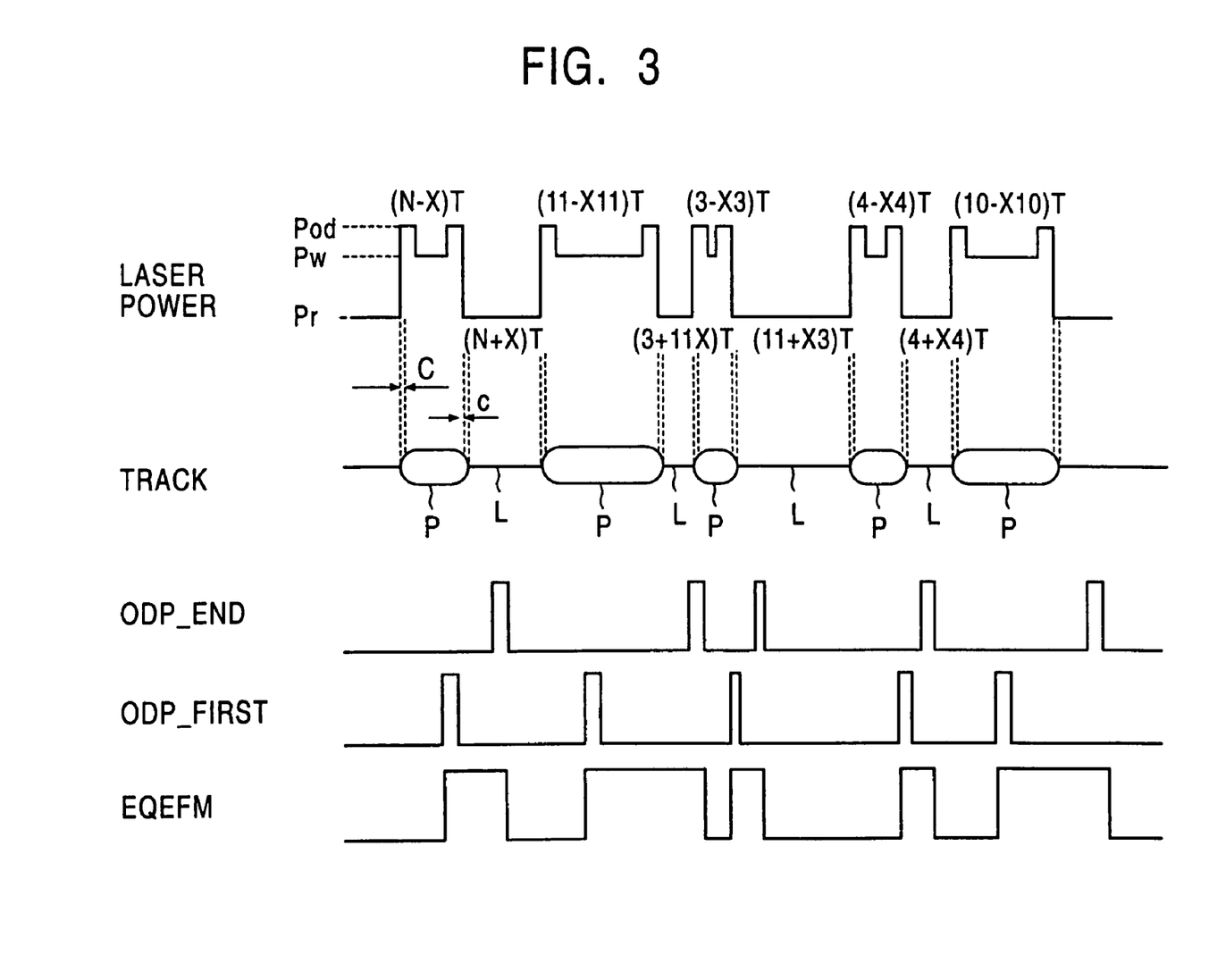
FIG. 3 includes illustrations of writing laser patterns and driving pulses of the embodiment.

FIG. 3 shows examples of the end overdrive pulse V3 (ODP_END), the first overdrive pulse V2 (ODP_FIRST), and the EQEFM signal V1.

These signals V1, V2, and V3 are converted into current values, and the current values are added to give the driving current i. The driving current i is used to output the laser power, as shown in FIG. 3. Specifically, power generated by the first overdrive pulse is added to the leading edge of the EQEFM signal, and power generated by the end overdrive pulse is added to the trailing edge. The symbol "Pr" indicates a reading laser level, the symbol "Pw" indicates a writing laser level, and the symbol "Pod" indicates a laser level obtained by the overdrive pulses.

Since the output laser power of the laser diode 4 is controlled as above, pits P and lands L are formed on the disk 90, as shown in FIG. 3.

Referring to FIG. 3, period C indicates a delay from the start of laser beam emission until the formation of the pit P starts. Period c indicates a delay from the termination of the laser beam emission until the formation of the pit P is completed.

Period C and period c are shorter than period A and period p and period a and period b shown in FIGS. 17 and 18. This indicates that, even when writing at a fast rate, pits and lands which accurately conform to the EFM signal are formed in this embodiment.

According to the embodiment, the end overdrive pulse and the first overdrive pulse are added to the EQEFM signal to generate the driving current i. The EQEFM signal, the end overdrive pulse, and the first overdrive pulse which are generated by the recording signal generator 21 are controlled so that the level and the pulse duration thereof are changed in accordance with corresponding recording conditions and the pit length and the land length before and after each pulse detected by the pit/land length detecting circuit 31. In addition, the pulse width is arbitrarily and variably set by the system controller 10 in accordance with each of 3 T to 11 T.

Specifically, the pulse width is obtained such that, for the EFM pulse having a width of (N)T, a signal which basically has a pulse width of (N−X(N))T is generated.

In other words, values "X3" to "X11" used to set the pulse width of the EQEFM signal are arbitrarily set in accordance with the pulses each having a corresponding width of 3 T to 11 T.

For example, FIG. 3 is associated with the EFM signal shown in FIG. 16. Referring to FIG. 3, concerning the EFM signal having a pulse duration of 3 T, the EQEFM signal having a pulse width of (3−X3)T is generated. Concerning the EFM signal having a pulse duration of 11 T, the EQEFM signal having a pulse duration of (11−X11)T is generated.

Specifically, the pulse width is controlled in accordance with a difference in the pulse width (difference in thermal storage on a recording track caused by a difference in laser irradiation periods). Accordingly, pits and lands which suitably conform to the EFM signal are formed.

For example, it is arranged that X3 to X11 take values 0.25 to 0.2, respectively.

The first overdrive pulse and the end overdrive pulse are added to the EQEFM signal. For example, various patterns as shown in FIGS. 4 to 9 are employed as waveform patterns (laser output level control patterns) to be combined. Referring to FIGS. 4 to 9, the symbol "L1" indicates a pulse width of the first overdrive pulse, and the symbol "L2" indicates a pulse width of the end overdrive pulse.

Figure 4:
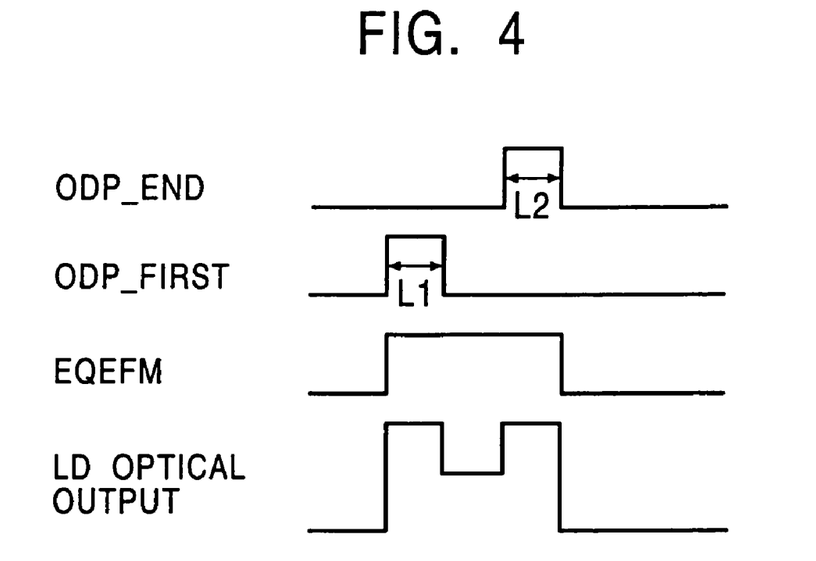
FIG. 4 is an illustration of an example of a writing laser pattern of the embodiment.

Referring to FIG. 4, L1=L2. In this example, the rising of the first overdrive pulse and the falling of the end overdrive pulse are in synchronism with the EQEFM signal.

Figure 5:
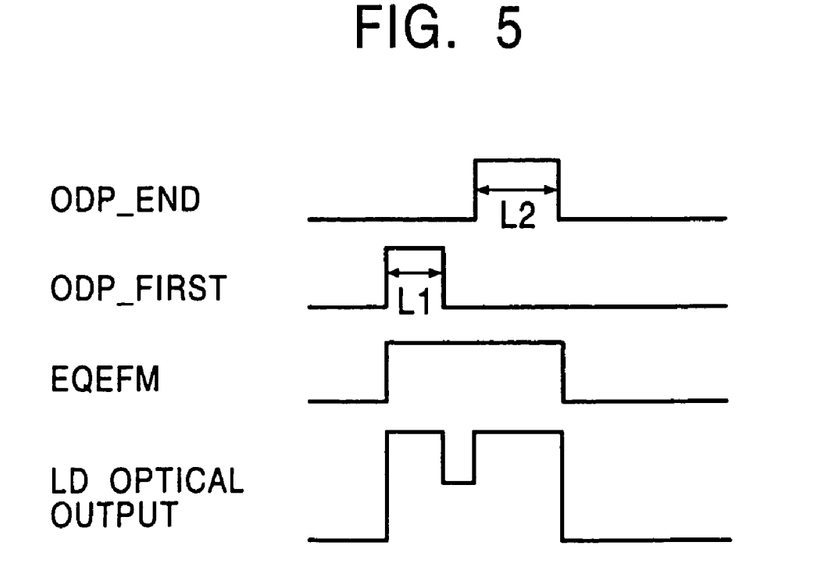
FIG. 5 is an illustration of another example of a writing laser pattern of the embodiment.

Referring to FIG. 5, L1<L2. In this example, the rising of the first overdrive pulse and the falling of the end overdrive pulse are in synchronism with the EQEFM signal.

Figure 6:
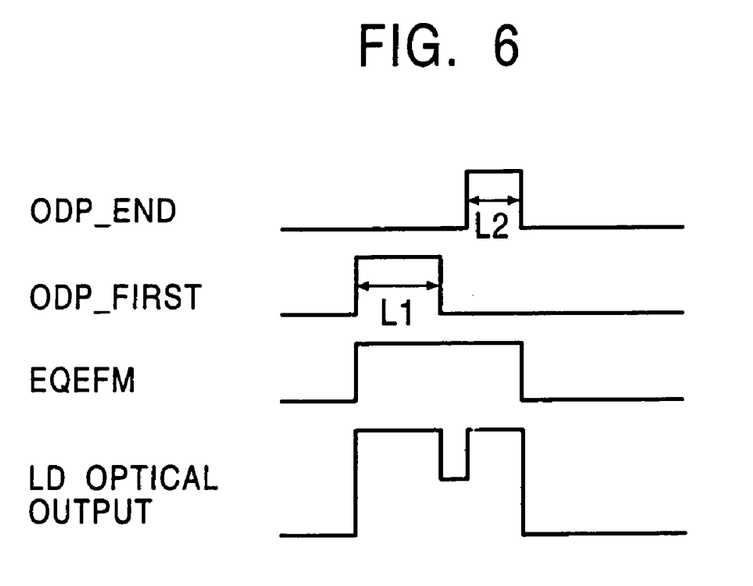
FIG. 6 is an illustration of another example of a writing laser pattern of the embodiment.

Referring to FIG. 6, L1>L2. In this example, the rising of the first overdrive pulse and the falling of the end overdrive pulse are in synchronism with the EQEFM signal.

Figure 7:
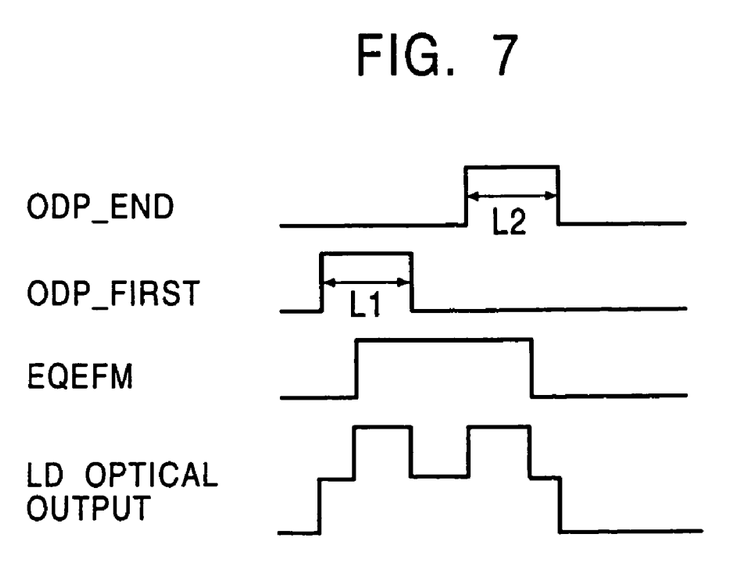
FIG. 7 is an illustration of another example of a writing laser pattern of the embodiment.

Referring to FIG. 7, L1=L2. In this example, the rising of the first overdrive pulse occurs prior to the EQEFM signal, and the falling of the end overdrive pulse occurs subsequently to the EQEFM signal.

Figure 8:
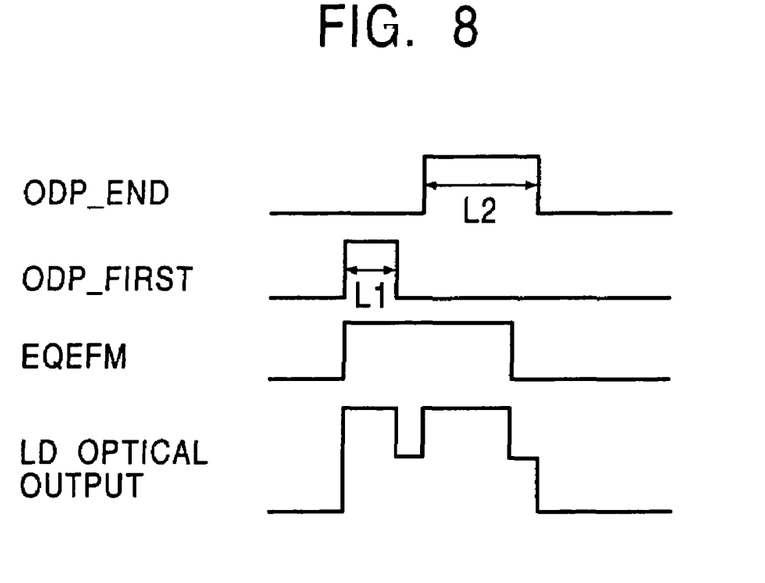
FIG. 8 is an illustration of another example of a writing laser pattern of the embodiment.

Referring to FIG. 8, L1<L2. In this example, the rising of the first overdrive pulse is in synchronism with the EQEFM signal, and the falling of the end overdrive pulse occurs subsequently to the EQEFM signal.

Figure 9:
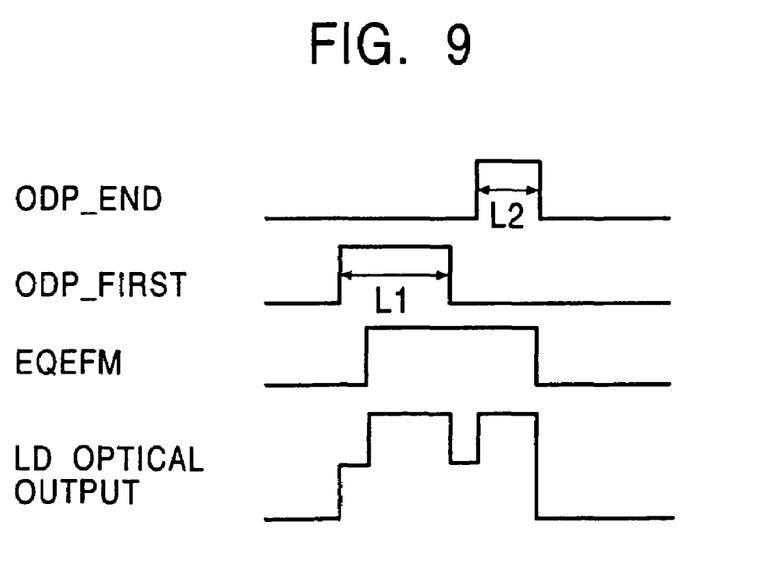
FIG. 9 is an illustration of another example of a writing laser pattern of the embodiment.

Referring to FIG. 9, L1>L2. In this example, the rising of the first overdrive pulse occurs prior to the EQEFM signal, and the falling of the end overdrive pulse is in synchronism with the EQEFM signal.

In each of the above examples, a laser beam emission pattern indicated by LD optical output is obtained.

Alternatively, patterns other than the above may be used.

Usage of each pattern, particularly, periods L1 and L2, is set in accordance with the pit length or the land length immediately before and after each pulse which is detected by the pit/land length detecting circuit 31. For example, when the preceding land segment is long, L1 is prolonged. In contrast, when the preceding land segment is short, L1 is shortened.

Specifically, the laser drive pattern is controlled in accordance with variations in the thermal storage caused by the pit length and the land length.

Periods L1 and L2 can be varied within a range of 0 T to 3 T.

Although not shown, the levels (voltage values) of the end overdrive pulse and the first overdrive pulse may be changed in accordance with the pit length or the land length immediately before and after each pulse, as in the case of the above L1 and L2.

Specifically, heat accumulated in the disk 90 is determined based on the quantity of the laser beam and the period. By changing the quantity of the laser beam, an appropriate laser drive pattern can be configured in accordance with variations in the thermal storage caused by the pit length and the land length.

For example, the level Pod shown in FIG. 3 may be changed by an increase of 20%, an increase of 25%, and an increase of 30% over the writing laser power Pw.

When writing, the CD-R disk 90 is rotated at a ×8 speed. At the same time, a parameter is supplied when generating each pulse. This is described with reference to the waveform patterns shown in FIG. 6 by way of example.

The EQEFM signal has a pulse width of (N−0.25)T. The first overdrive pulse has a pulse duration of L1 and the end overdrive pulse has a pulse width of L2. When the length of a land immediately formed before or after the first overdrive pulse or the end overdrive pulse is 8 T, L1=1.75 T and L2=1 T. The levels (amplitude) of these pulses are approximately 30% greater than the level of the EQEFM signal. The pulse width of the first overdrive pulse is varied by setting the parameter for the signal generator 21 by the system controller 10 in accordance with the pit length (3 T to 11 T) to be recorded and the land length (3 T to 11 T) formed immediately before and after the pulse. Specifically, the land length immediately before the pulse may take nine different values. The pit length to be recorded may take nine different values. The land length immediately after the pulse may take nine different values. Taken all together, the parameter has 729 different combinations. For example, when L1=1.75 T and the pit length to be recorded is 4 T, the parameter is set to 1.05 T. When the pit length to be recorded ranges from 5 T to 11 T, the parameter is set to 0.35 T. In addition, in accordance with the land length before the pulse, −0.2 T to +0.2 T is added. For example, when L1=1.75 T is used as a reference value, the parameter may take a value ranging form 1.55 T to 1.95 T.

Actually, the pulse width and the pulse level are adjusted depending on the material of the disk 90 (material of the dye film), the manufacturer, the recording linear velocity, the recording rate, and the characteristics of the optical system of the pick-up 1.

A difference in thermal reaction is caused by a different material of the dye film. When writing, it is advantageous to determine the type and the manufacturer of the mounted disk 90 and to adjust the pulse width and the pulse level. The operating environment while writing, such as the recording linear velocity and the recording rate, can be transferred from the system controller 10 to the recording signal generator 21. Hence, the pulse duration and the pulse level can be adjusted. This is advantageous for performing appropriate recording.

According to the embodiment described above, the end overdrive pulse and the first overdrive pulse are added to the EQEFM signal, thereby generating the driving current i. Hence, the laser emission control as shown in FIG. 3 is performed. The recording signal generator 21 adjusts the EQEFM signal, the end overdrive pulse, and the first overdrive pulse so that the level and the pulse width thereof are varied in accordance with the corresponding recording conditions and the pit length and the land length immediately before and after each pulse. The pulse width is arbitrarily and variably set in accordance with each of 3 T to 11 T. Accordingly, satisfactory writing is performed even at, for example, a ×8 writing speed.

Figure 10:
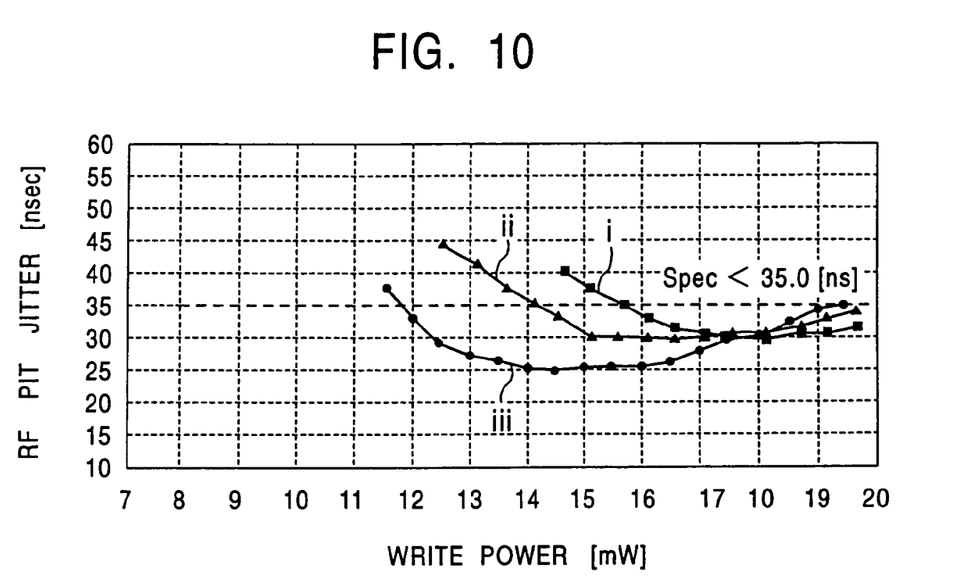
FIG. 10 is a graph showing the writing laser power and pit jitter characteristics obtained by a cyanine-based disk of the embodiment.
Figure 11:
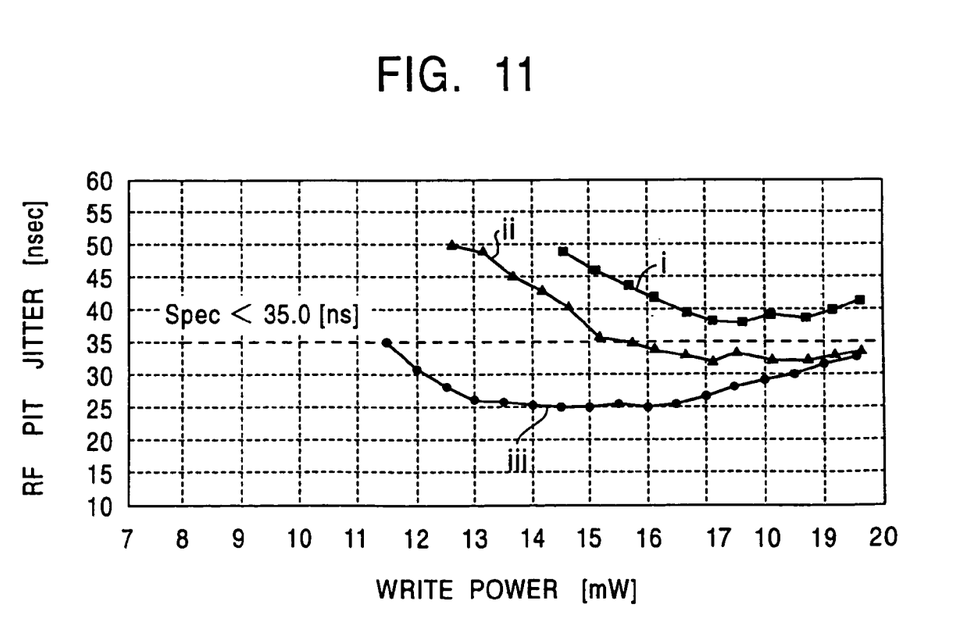
FIG. 11 is a graph showing the writing laser power and land jitter characteristics obtained by the cyanine-based disk of the embodiment.

FIGS. 10 and 11 show measurements of the writing laser power and pit jitter characteristics and the writing laser power and land jitter characteristics, respectively, when writing is performed at a ×8 speed using a disk on which a cyanine-based organic dye film is formed. In this case, a value corresponding to the level Pod in FIG. 3 is obtained by increasing the writing laser power Pw by 30%.

Referring to FIGS. 10 and 11, symbols i and ii indicate characteristics obtained by performing laser power control by using the methods shown in FIGS. 14 and 15, respectively. Characteristics obtained by using a laser power control method of the embodiment are indicated by iii.

The level of 35.0 nsec indicated by broken lines is the allowable limit of the jitter value.

Figure 12:
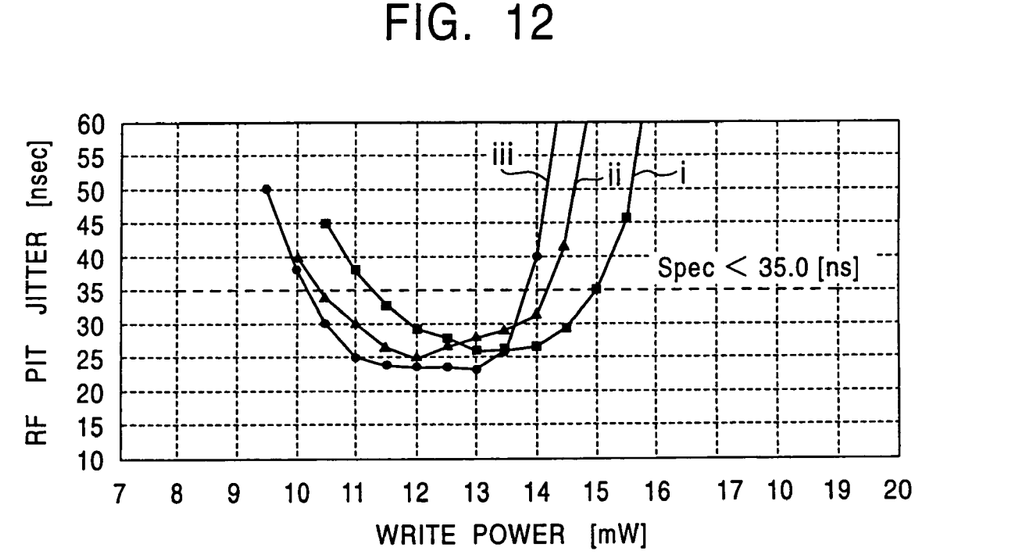
FIG. 12 is a graph showing the writing laser power and pit jitter characteristics obtained by a phthalocyanine-based disk of the embodiment.
Figure 13:
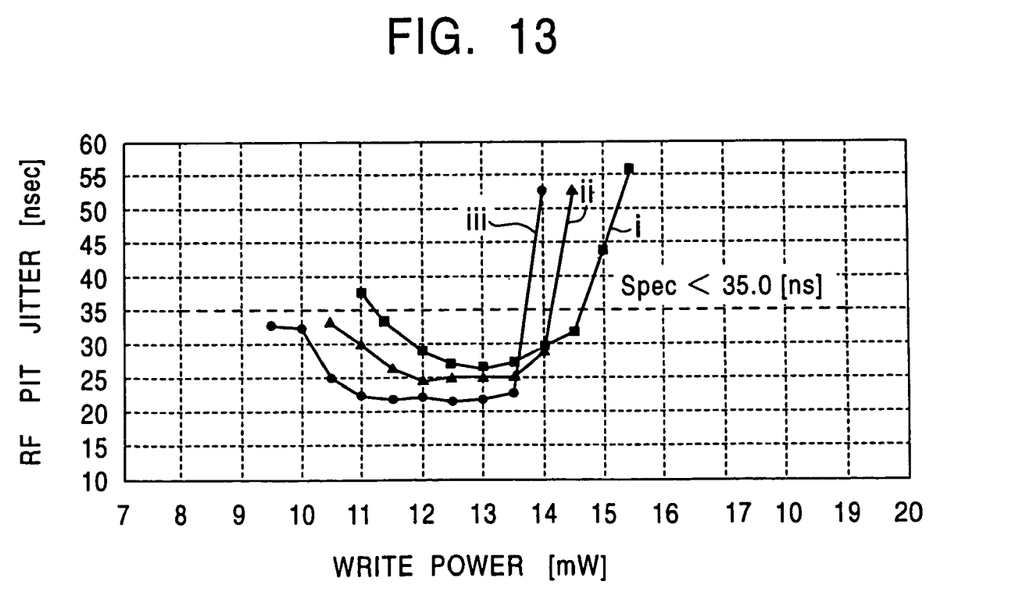
FIG. 13 is a graph showing the writing laser power and land jitter characteristics obtained by the phthalocyanine-based disk of the embodiment.

FIGS. 12 and 13 show measurements of the writing laser power and pit jitter characteristics and the writing laser power and land jitter characteristics, respectively, when writing at a ×8 speed is performed using a disk on which a phthalocyanine-based organic dye film is formed. In this case, a value corresponding to the level Pod in FIG. 3 is obtained by increasing the writing laser power Pw by 25%.

It can be concluded from the measurement results shown in FIGS. 10 to 13 that, independent of the material of the organic dye film, the pit jitter and the land jitter in the embodiment indicated by iii are significantly improved compared with i and ii. In addition, a jitter power tolerance on the writing laser power is greatly improved.

Specifically, it can be understood that the laser power control of the embodiment is suitable for writing at a fast rate, such as a ×8 writing speed.

The embodiment is described hereinabove. Various modifications can be made to the examples of the driving pulse waveform patterns for forming the pits, the recording conditions for variably setting the pulse duration and the level, the set values, and the like.

The invention claimed is:

1. A recording apparatus, comprising:
    laser means for performing laser beam irradiation with a supplied driving pulse to form a recording data row on a recording medium, said data row being formed of pits and lands;
    driving pulse generating means for generating pulses in accordance with recording data to be recorded, said pulses including a first recording power level portion for irradiating the laser means at a first recording power level, a second recording power level portion to be combined with a leading edge of the first pulse portion for irradiating the laser means at a second recording power, and a third recording power level portion to be combined with a trailing edge of the first pulse portion for irradiating the laser means at a third recording power, wherein said second and third recording power levels are larger than said first recording power level; and
    pulse generation control means for controlling at least one of the first, second, and third pulse portions generated by said driving pulse generating means so that at least one of a level and a portion width thereof is varied in accordance with a length of at least one of a pit and a land to be formed.

2. The recording apparatus according to claim 1, wherein said pulse generation control means further comprises:
    means for variably setting, in accordance with a predetermined recording condition, the second and/or the third recording power level.

3. The recording apparatus according to claim 1, wherein said pulse generation control means further comprises:
    means for variably setting, in accordance with the length of at least one of the land immediately formed before, the pulse width of at least one of the second and third pulse portions.

4. The recording apparatus according to claim 1, wherein said laser means irradiates a reproducing power level lower than the first recording power level before the second recording power level.

5. A recording method, comprising:
    generating a laser beam to form a recording data row on a recording medium, said data row being formed of pits and lands; and
    modulating the laser radiation to have a reproducing power level, a first recording power level, a second recording power level larger than the first recording power level to be generated before the first recording power level, and a third recording power level larger than the first recording power level to be generated after the first recording power level,
    wherein at least one of a width of said second and third recording power levels is controlled so that the width is varied in accordance with a length of at least one of a pit and a land to be formed.

6. A recording method, comprising:
    generating a pulse in accordance with data to be recorded on a recording medium, said pulses including a first pulse portion, a second pulse portion to be combined with a leading edge of the first pulse portion, a third pulse portion to be combined with a trailing edge of the first pulse portion, and a fourth pulse portion to be combined with a leading edge of the second pulse; and
    irradiating a laser beam in accordance with the pulses generated in said generating step to form a recording data row on the recording medium, said data row being formed of pits and lands,
    wherein a width of at least one of the second and third pulse portions is controlled so that the width is varied in accordance with a length of at least one of a pit and a land to be formed.

7. The recording method according to claim 6, wherein a second and a third recording laser power to be irradiated in accordance with said second and third pulse portions are larger than a first recording laser power to be irradiated accordance with said first pulse portion.

8. The recording method according to claim 6, wherein a reproducing laser power to be irradiated in accordance with said forth pulse portion is smaller than a first recording laser power to be irradiated accordance with said first pulse portion.

9. The recording method according to claim 6, wherein said generating step comprises:
variably setting, in accordance with a predetermined recording condition, each of the first, second, and third recording power levels.

10. The recording method according to claim 6, wherein said generating step comprises:
variably setting, in accordance with a predetermined recording condition, the width of the second and third recording power levels within a range of 0 T to 3 T.

11. A recording apparatus, comprising:
a laser driver for generating a driving pulse in accordance with data to be recorded, said driving pulse including a first recording power level portion, a second recording power level portion provided before the first recording power level portion, and a third recording power level portion provided after the first recording power level portion;
a laser supplied with the driving pulse to form a recording data row on a recording medium using laser beam irradiation, said laser irradiating a first, second, and third recording power level in accordance with said first, second, and third recording power level portions, said second and third recording power levels being larger than said first recording power level; and
a pulse generation controller for controlling a width of at least one of the second and third recording power level portions to be generated by said laser driver so that the pulse width thereof is varied in accordance with a length of at least one of a pit and a land to be formed.

12. The recording apparatus according to claim 11, wherein said pulse generation control means is configured to set the level of the second and third recording power levels in accordance with a predetermined recording condition.

13. The recording apparatus according to claim 11, wherein said pulse generation controller is configured to set the pulse width of at least the pulse of the second and third recording power levels in accordance with a length of at least one of the land immediately formed before.

14. The recording apparatus according to claim 11, further comprising:
a detector configured to detect a length of the land immediately formed before a pit to be formed,
wherein said pulse generation controller is configured to vary the pulse width of at least the pulses having the second and third recording power levels in accordance with the detected land length.

15. The recording apparatus according to claim 14, wherein said detector detects a length of the pit immediately to be formed after the land; and
said pulse generation controller is configured to vary the pulse width of at least the pulse having the second recording power level in accordance with the detected pit length.

* * * * *